(12) United States Patent
Lawless, III et al.

(10) Patent No.: US 11,718,003 B2
(45) Date of Patent: Aug. 8, 2023

(54) METHOD FOR SIMULTANEOUS CLOSED LOOP CONTROL OF GAS ASSIST AND GAS COUNTER PRESSURE IN AN INJECTION MOLDING PROCESS RELATIVE TO PLASTIC MELT PRESSURE AND PLASTIC MELT FLOW POSITION

(71) Applicant: IMFLUX INC., Hamilton, OH (US)

(72) Inventors: William Francis Lawless, III, Medford, MA (US); H. Kenneth Hanson, III, Cincinnati, OH (US); Gene Michael Altonen, West Chester, OH (US); Chow-Chi Huang, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 1079 days.

(21) Appl. No.: 16/386,523

(22) Filed: Apr. 17, 2019

(65) Prior Publication Data

US 2019/0366607 A1 Dec. 5, 2019

Related U.S. Application Data

(60) Provisional application No. 62/704,009, filed on Jun. 5, 2018.

(51) Int. Cl.
*B29C 45/17* (2006.01)

(52) U.S. Cl.
CPC ...... *B29C 45/1732* (2013.01); *B29C 45/1704* (2013.01); *B29C 45/174* (2013.01); *B29C 2045/1728* (2013.01); *B29C 2945/76006* (2013.01); *B29C 2945/7611* (2013.01); *B29C 2945/76083* (2013.01); *B29C 2945/76137* (2013.01); *B29C 2945/76498* (2013.01);
(Continued)

(58) Field of Classification Search
CPC ...... B29C 45/1732; B29C 2945/76779; B29C 45/174; B29C 45/1704; B29C 2945/76006; B29C 2945/76083; B29C 2945/76498; B29C 2945/76812; B29C 2945/76501

See application file for complete search history.

(56) References Cited

U.S. PATENT DOCUMENTS

| 5,258,918 A | 11/1993 | Giancola |
| 5,558,824 A | 9/1996 | Shah et al. |

(Continued)

FOREIGN PATENT DOCUMENTS

| CN | 107848175 A | 3/2018 |
| DE | 19613134 A1 | 10/1997 |

(Continued)

OTHER PUBLICATIONS

Translation of DE 196 13 134 (Year: 1997).*

(Continued)

*Primary Examiner* — Xiao S Zhao
*Assistant Examiner* — John J DeRusso
(74) *Attorney, Agent, or Firm* — Marshall, Gerstein & Borun LLP

(57) ABSTRACT

A controller for an injection molding system is in communication with a melt flow control unit, a gas assist control unit, and a gas counter pressure control unit. The controller can effect real-time adjustments to gas assist pressure and/or gas counter pressure as a function of melt pressure or flow front position.

10 Claims, 4 Drawing Sheets

(52) U.S. Cl.
CPC ............... *B29C 2945/76779* (2013.01); *B29C 2945/76812* (2013.01); *B29C 2945/76859* (2013.01); *B29C 2945/76933* (2013.01)

(56) References Cited

U.S. PATENT DOCUMENTS

| | | |
|---|---|---|
| 5,707,659 A | 1/1998 | Erikson |
| 5,916,501 A | 6/1999 | Hehl |
| 6,019,918 A | 2/2000 | Guergov |
| 6,645,587 B1 | 11/2003 | Guergov |
| 7,556,754 B2 | 7/2009 | Baba et al. |
| 10,226,889 B2 | 3/2019 | Pollard et al. |
| 2004/0256755 A1 | 12/2004 | Baba et al. |
| 2012/0292823 A1 | 11/2012 | Altonen et al. |
| 2013/0069280 A1 | 3/2013 | Altonen et al. |
| 2017/0001346 A1* | 1/2017 | Hanson, III .......... B29C 45/561 |
| 2017/0001356 A1* | 1/2017 | Hanson, III ............ B29C 45/78 |
| 2017/0021543 A1 | 1/2017 | Pollard et al. |
| 2017/0057147 A1 | 3/2017 | Altonen et al. |

FOREIGN PATENT DOCUMENTS

| | | |
|---|---|---|
| EP | 0264453 A1 | 4/1988 |
| EP | 0548779 A1 | 6/1993 |
| WO | WO-99/41057 A1 | 8/1999 |

OTHER PUBLICATIONS

Courbebaisse, Numerical simulation of injection moulding process and the pre-modelling concept, Computational Materials Science, 34(4):397-405 (2005).

Shoemaker et al., Moldflow Design Guide: A Resource for Plastics Engineers, First Edition, Retrieved from the Internet: <marciaswan.weebly.com/uploads/1/3/5/8/13585698/mfdg_low-res_proof_part1.pdf> (Dec. 31, 2006).

Chinese Patent Application No. 201980037544.6, First Office Action, dated Mar. 29, 2022.

International Application No. PCT/US2019/027898, International Search Report and Written Opinion, dated Aug. 1, 2019.

International Preliminary Report on Patentability and Accompanying Article 34 Amendments for International Applicaiton No. PCT/US2019/027898, dated Jul. 29, 2020.

\* cited by examiner

METHOD FOR SIMULTANEOUS CLOSED LOOP CONTROL OF GAS ASSIST AND GAS COUNTER PRESSURE IN AN INJECTION MOLDING PROCESS RELATIVE TO PLASTIC MELT PRESSURE AND PLASTIC MELT FLOW POSITION

CROSS-REFERENCE TO RELATED APPLICATION

This non-provisional application claims the benefit of the filing date of U.S. Provisional Application No. 62/704,009, filed Jun. 5, 2018, the entirety of which is hereby incorporated by reference.

FIELD OF THE DISCLOSURE

This application relates generally to injection molding and, more specifically, to a method of simultaneous closed loop control for the variable air pressures and durations for internal gas pressure ("Gas Assist") and external gas pressure ("Gas Counter Pressure") in an injection molding process using a melt pressure transducer in conjunction with cavity pressure sensor, thermocouple, strain gauge, or a sensor-less option as a proxy to melt travel position within a cavity of a mold for the part that is being molded. In particular, this disclosure relates to identifying relationships among apparent melt pressure, Gas Assist, and Gas Counter Pressure, and variably changing the internal gas pressure, the external gas pressure, and/or the cavity pressure, in real time, based on, for instance, the position of melt flow front for a cavity within an injection mold by at least one cavity pressure transducer, thermocouple, or strain gauge.

BACKGROUND

At the commencement of an injection molding process, thermoplastic pellets are fed by a hopper into a heated barrel and driven to the end of the heated barrel by a reciprocating screw. The thermoplastic pellets melt into a molten thermoplastic material, and shots of thermoplastic material are injected through a nozzle. The molten thermoplastic material then flows through either a cold runner or a hot runner to the gates of each individual cavity of a mold. After entering the gate, the molten thermoplastic material fills a mold cavity formed between two or more sides of the mold held together under pressure by a press or clamping unit. Once the shot of molten thermoplastic material is injected into the mold cavity, the reciprocating screw stops traveling forward. The molten thermoplastic material takes the form of the mold cavity and cools inside the mold until it solidifies. Then the clamping unit releases the mold sides and the finished part is ejected from the mold.

The injection molding process may incorporate auxiliary equipment that assists in the filling of plastic into a mold to help achieve better part quality or reduce cycle time, or both. For example, Gas Assist molding uses Nitrogen or other inert gas injected into the plastic melt during filling of the mold to displace plastic in the center of thicker wall parts, resulting in a reduction of overall plastic wall thickness and often decreasing cycle time. The resulting part typically has a bubble of air on the inside of the part which typically is not visible to or readily detectable or appreciated by an end user unless the part is cut in half or otherwise cut into sections. Gas Counter Pressure uses Nitrogen or other inert gas to pressurize the cavity of the mold before and/or during filling with plastic and exerts gas pressure on the melt flow front to influence the fountain flow and subsequently the skin layer and cosmetic appearance of the part. Conventionally, when both Gas Assist and Gas Counter Pressure are both used in a single injection molding shot, neither Gas Assist nor Gas Counter Pressure process sends or receives analog or digital inputs/outputs to/from the other process to influence control of the amplitude of gas pressure, and/or acceleration or deceleration of gas pressure, and/or time of gas pressurization. In other words, there is a lack of interdependent control of Gas Assist, Gas Counter Pressure, and cavity pressure.

The majority of auxiliary equipment that is currently available for both Gas Assist and Gas Counter Pressure processes primarily use open-loop control systems. Although there may be a digital output from the injection molding machine that pertains to a specific event (e.g., mold-closed, start injection, injection position, or end of fill), there is not continuous communication with any temperature or pressure sensors within the mold to turn the gas pressure on or off, or increase or decrease the pressure accordingly. Typically, a profile is pre-set by the technician or operator based on previous experience and/or trial and error. Once that profile has been established it starts when the appropriate output is received from the injection molding machine, sometimes with a delay timer added which increases the chance of variation between cycles of the machine over a longer production run. For instance, Gas Counter Pressure is often initiated upon detection of the mold being closed at the initiation of a cycle. Gas Assist pressure may be set to initiate based on a delay timer that commences upon the start of injection of molten polymeric material. Each of the Gas Counter Pressure and Gas Assist pressure may then cut off after respective predetermined delays from their initiation. However, there can be situations where such time-dependent operation can be inadequate to properly account for appropriate control of the respective operations. For instance, if the Gas Assist pressure initiates based on a signal dependent upon a delay timer, the Gas Assist pressure automatically initiates upon that delay timer detecting the predetermined time after some prior event has elapsed, but in the event a valve is stuck in a closed position, molten polymer material may not have started to flow into the mold cavity, yet gas assist gas is undesirably prematurely introduced to the mold cavity. Alternately, where termination of introduction of either the Gas Counter Pressure gas or Gas Assist gas is dependent only upon a delay timer, a premature opening of the mold can result in the Gas Counter Pressure or Gas Assist gas still being introduced when the cavity is opened, adversely resulting in a sudden release of built-up Gas Counter Pressure or Gas Assist pressure.

Ideally, sensors for monitoring melt pressure, internal gas pressure, external gas pressure and melt flow front position in an injection mold during the injection molding process would be utilized in combination with controlling algorithms to allow the internal and external gas pressures to start, increase, decrease and/or stop based on real time feedback of how the mold is filling and what melt pressure is actually being achieved as it enters the mold cavity, as well as the interaction with the other gas injection equipment (internal or external) that is being used.

For example, instead of starting to increase Gas Assist Pressure and introducing it into the plastic melt stream based on an injection molding machine parameter or timer, it would be more accurate to initiate (or increase) Gas Assist Pressure based upon a real-time melt pressure of plastic material entering the mold passing a predetermined threshold. Additionally, the corresponding position of melt flow front inside of the mold cavity could be used as a trigger. In addition, feedback from the external Gas Counter Pressure unit that is simultaneously being used would be more ideal to adapt to variances in the process that this additional equipment is introducing. The same reasoning can also be applied to controlling Gas Counter Pressure as it relates to filling the mold itself while interacting with the Gas Assist Pressure. Moreover, desired relationships between Gas Counter Pressure and Gas Assist Pressure can be maintained if the controller of an injection molding system had the capability to effect changes in one of the Gas Assist or Gas Counter Pressure based on a detected condition of the other, or based on detection of some other condition.

Monitoring and controlling the way the plastic is filling the mold or cavity in closer proximity to the cavity being filled yields more accurate and repeatable control, which is essential for manufacturing and Process Validation, particularly in the Automotive or Medical markets.

SUMMARY

Embodiments within the scope of the present disclosure are directed to methods of controlling injection of plastic material into an injection mold while using closed loop control for both Gas Assist and Gas Counter Pressure simultaneously to assist in the manner in which the plastic is introduced into and subsequently fills the cavity of the mold. The method that is described will relate to a substantially low constant pressure filling technique using a melt pressure transducer to monitor the actual melt pressure of plastic material entering into the mold but may be applied to other filling techniques such as standard injection velocity control using a similar monitoring of plastic melt pressure.

Throughout injection of plastic in an injection molding process, the typical proxy that is used by the injection molding machine for melt pressure is either the hydraulic pressure exerted on the back of an injection piston or the amount of force exerted on a load cell on the back of a screw. A calculation is then made to approximate what the actual plastic melt pressure is at the front of the screw during injection by comparing the difference in area between where the force or pressure is being measured and the area of the screw tip that is exerted on the plastic melt. The method that is used depends on whether the machine injection is controlled hydraulically or electrically. This method of calculating actual melt pressure can be compromised by the variation in geometry at the front of the screw tip as well as variation due to pressure drop based on one or more of the following: Clearance between screw and barrel, screw check ring performance, or the geometry of additional components, such as mixers or extended nozzles.

Ideally, the use of an actual Melt Pressure Transducer closer to the nozzle tip of the injection unit gives a much more accurate measurement of what the actual plastic melt pressure is of the plastic material that is entering the mold.

In addition to determining the actual melt pressure of the plastic that is entering a mold or cavity, it is useful to have an indication of how full the mold cavity is at a given moment during the injection cycle. The most accurate indication of how full a cavity is during injection of the plastic material is the location of the actual melt flow front inside of the mold cavity. The majority of plastic part manufacturers achieve this by using the position of the screw during injection as a proxy for the location of the melt flow front. Although this method is widely used, there is the possibility of error or inaccuracy due to many factors, such as check ring performance, screw and barrel wear, inconsistent decompression of the screw or changes in viscosity of the material, to name a few.

An alternate method for determining the melt flow front position involves employing a cavity pressure transducer directly on, or indirectly associated with, the molding surface of the cavity to take an actual pressure reading when plastic flows over the sensor. Although this method is much more accurate than using a screw position as a proxy to melt flow front location, there is the possibility of error or inconsistency due to many factors such as incorrect installation, electrical or connection issues, or the placement of the sensor within the cavity of the mold. For example, a sensor located midway along the flow length of the part will give different information than one placed at 25% or 75% of the flow length. In addition, the cavity pressure transducers can be costly (hardware, software and additional design and machining of the injection mold required) and require that there would be an allowance for a witness line on the molded part, which may not be aesthetically acceptable for certain plastic parts and may require some degree of post-mold processing to remove or obscure.

A method for determining the melt flow front location without a cavity pressure transducer would be more accurate than screw position alone, but could reduce or eliminate the cost of hardware, and avoid the impact on the aesthetics of the molded article, such as by a witness line, or the efforts necessary to remove such a visual impairment during post-mold processing. Such alternate methodologies of melt flow front position may include a thermocouple or a strain gauge.

Gas Assist molding utilizes Nitrogen or other inert gas to assist in the completion of filling and packing out of an injection molded part. After a certain amount of plastic has entered the mold, a pin that is located in the flow area of the plastic opens and injects gas into the molten plastic material to blow a pressurized bubble, typically from 150-2500 psi, aiding in the completion of the filling of the cavity by filling out a portion of the interior of the molded article with the inert gas instead of plastic. The pin then allows the pressurized gas to exhaust to atmospheric pressure to prevent the part from bursting during mold open. The point in time that the air injection starts during a given injection cycle is dependent on the volume of plastic that has already been injected. There needs to be a sufficient volume of plastic to entirely encapsulate the resulting air bubble. If there is not enough plastic material, then the plastic wall thickness will become too thin when the gas is injected and it will burst before filling out the outer volume of the cavity.

The profile of the gas injection is often determined based on an operator or technician's prior experience and is often essentially a trial-and-error based process. It would be preferable to establish a gas injection profile using real time feedback from the plastic melt pressure and flow front position, as well as additional feedback from other auxiliary equipment such as Gas Counter Pressure unit.

The Gas Counter Pressure process may also utilize Nitrogen or other inert gas. The Gas Counter Pressure acts on the exterior of the molten material while the material is advancing within the mold cavity, to assist in filling out a plastic part. One benefit of the use of Gas Counter Pressure is that it can impart an improved surface appearance to the molded article. The majority of injection molding processes that utilize Gas Counter Pressure are in foamed plastics, however it is also used in non-foamed applications. The counter pressure that is exerted on the molten plastic flow front assists in creating a more resin rich outer surface of the part while also assisting in helping maintain constant contact of the molten plastic to the core and cavity walls during filling.

The Gas Counter Pressure process is often set up based on an operator or technician's prior experience and, like Gas Assist, is conventionally often a trial-and-error based process. Also like Gas Assist, it would be advantageous to establish a Gas Counter Pressure using real time feedback from the plastic melt pressure and flow front position as well as any additional feedback from other auxiliary equipment such as a Gas Assist unit.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
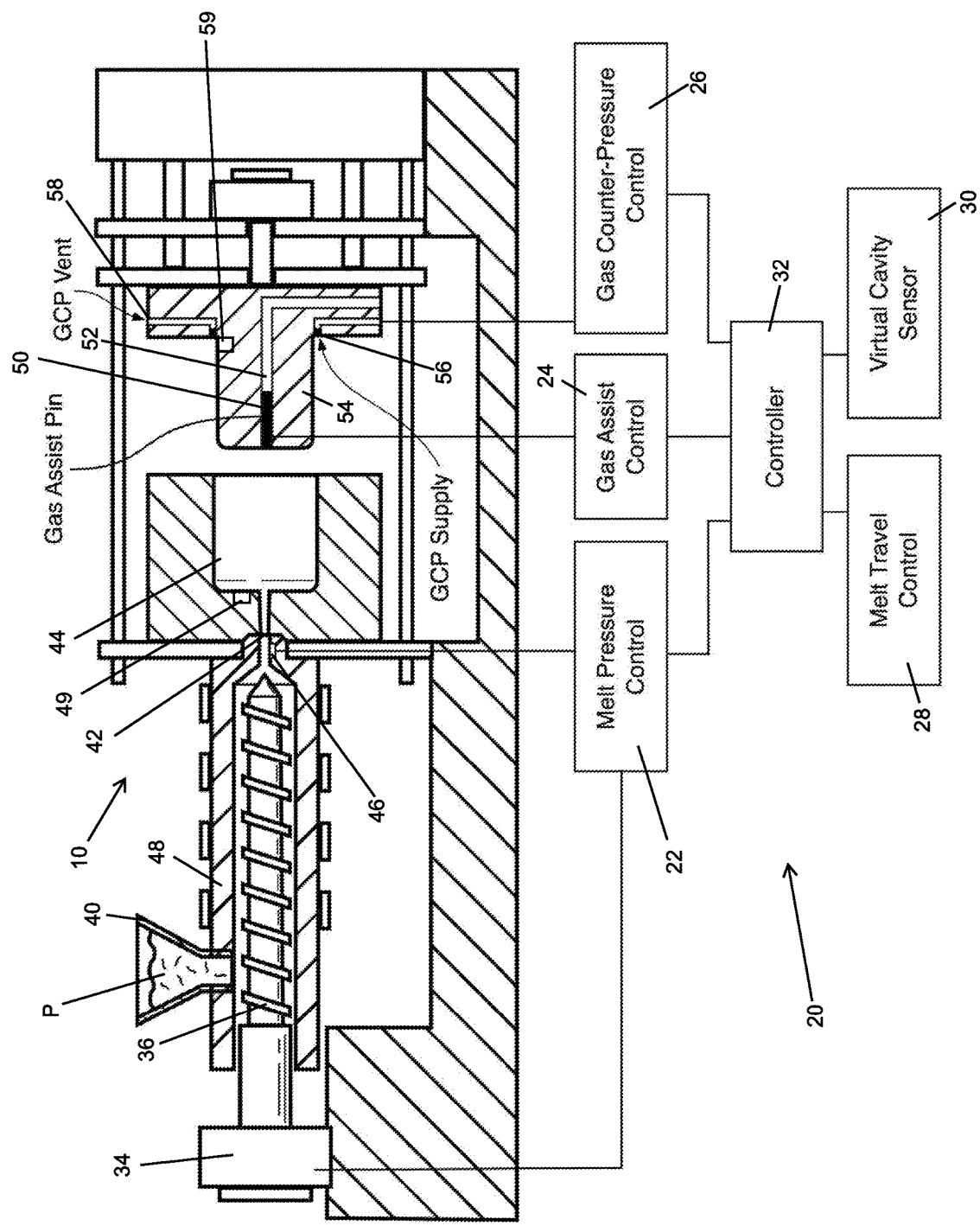
FIG. 1 illustrates, semi-schematically, an injection molding apparatus, wherein a controller utilizes inputs from a melt pressure transducer, a virtual (or actual) melt flow front position sensor, a Gas Assist apparatus and a Gas Counter Pressure apparatus. The controller is networked with the various inputs and components so as to monitor and control the injection of plastic as well as the injection of gas for the Gas Assist and Gas Counter Pressure processes, with the ability to initiate, stop, and vary any of the three.

Referring to the figures in detail, FIG. 1 illustrates an exemplary injection molding apparatus 10 that uses a control system 20 configured to change a gas assist pressure and a gas counter-pressure at least in part based on the determined melt pressure or the determined flow front position. The exemplary control system comprises a controller and other control system units that include: a Melt Pressure Control Unit 22, a Gas Assist Control Unit 24, a as counter-pressure control unit 26, a melt travel control unit 28, and a virtual cavity sensor 30. A controller 32 is communicatively connected with each of the above control system units.

The controller 32 can include a microprocessor, a memory, and one or more communication links. By way of the communication links, the controller 32 can send commands or other information to other units in the control system 20 to initiate, activate or adjust injection molding cycles, melt pressure changes, gas assist pressure, gas counter-pressure, and/or other processes that can be controlled by the corresponding units. For example, for each aspect of the injection molding process, including melt pressure control and gas control, among other possibilities, the controller can change set points or timing of transitions from one operation state to another, as described in more detail below. The controller 32 also can receive, by way of communication links, information about process conditions, environmental conditions, operator commands, etc. The information can be sent to the controller 32 from the other units, from an operator, and/or from a variety of sensors (not shown) disposed at or outside of the injection molding apparatus 10. The controller 32 can use the received information to compute required changes in the injection molding process and communicate these changes to the other units in the control system.

The Melt Pressure Control Unit 22 can receive from the controller 32 a command to initiate an injection molding cycle. The Melt Pressure Control Unit 22 can be communicatively connected to an actuator 34 that can be, in turn, mechanically connected to a reciprocating screw 36. The actuator 34, based on a command from the Melt Pressure Control Unit 22, can begin turning the reciprocating screw 36 and can adjust the rotation rate of the reciprocating screw based on the signals from the Melt Pressure Control Unit 22.

Pellets P supplied to a hopper 40 can be melted by a heater and can supply or replace the melted thermoplastic material displaced by the screw 36 through the nozzle 42 and into the mold cavity 44.

The Melt Pressure Control Unit 22 is also in signal communication with a melt pressure sensor 46 for the purpose of determining the melt pressure of the injected molten thermoplastic material. The Melt Pressure Control Unit 22 can receive the melt pressure signal indicative of melt pressure from the melt pressure sensor 46 and can adjust the actuation of the screw 36 in view of the melt pressure signal data by signaling the actuator 34 to effect the desired adjustments. The melt pressure sensor 46 may be in fluid communication with the molten thermoplastic material, or alternatively, sensors indicative of melt pressure may be provided elsewhere, as a proxy for melt pressure. The melt pressure sensor 46 is a sensing device that senses pressure at one of: (i) a back of the piston; (ii) a load cell at a back of the screw; or (iii) in a melt stream at a location downstream of a tip of the screw 36, or anywhere between the screw tip and a cavity gate.

The melt pressure sensor 46 can facilitate detection (direct or indirect) of the actual melt pressure (e.g., the measured melt pressure) of the molten thermoplastic material in, at, or near the nozzle 42. The melt pressure sensor 46 may or may not be in direct contact with the molten thermoplastic material. In one embodiment, the melt pressure sensor 46 can be a pressure transducer that transmits an electrical signal to an input of the control system 20 in response to the melt pressure at the nozzle 42. In other embodiments, the melt pressure sensor 46 can facilitate monitoring of any of a variety of additional or alternative characteristics of the molten thermoplastic material at the nozzle 42 that might indicate melt pressure, such as temperature, viscosity, and/or flow rate, for example. If the melt pressure sensor 46 is not located within the nozzle 42, but is instead located upstream or downstream of the nozzle 42, the control system 20 can be set, configured, and/or programmed with logic, commands, and/or executable program instructions to provide appropriate correction factors to estimate or calculate values for the measured characteristic in the nozzle 42 based on the actual position of the melt pressure sensor 46. It is to be appreciated that sensors other than a melt pressure sensor can be employed to measure any other characteristics of the molten thermoplastic material, the screw 36, the barrel 48, or the like that is known in the art, such as temperature, viscosity, flow rate, strain, velocity, or one or more of any other characteristics that are indicative of any of these.

The melt pressure sensor 46 may or may not be in direct contact with the melt. In some implementations, the melt pressure sensor 46 may be replaced by a different sensor that generates a signal that can be used to estimate the melt pressure. Additionally or alternatively, the Melt Pressure Control Unit 22 may be in signal communication with a different sensor that indicates the rate of injection or a total amount of thermoplastic material injected into the mold cavity, from which the melt pressure of the injected material may be determined.

The signal from the melt pressure sensor 46 can be processed by the Melt Pressure Control Unit 22. For example, the Melt Pressure Control Unit 22 may calculate a melt-pressure error between the melt pressure determined by measurement and a target melt pressure communicated by the controller 32. Using the melt-pressure error, the Melt Pressure Control Unit 22 may calculate the signal that drives the actuator 34 of the reciprocating screw 36. The actuator 34 may increase the torque or force applied to the reciprocating screw 36, thereby increasing the melt pressure, or, conversely, decrease the torque or force applied to the reciprocating screw 36, thereby decreasing the melt pressure. In this manner closed-loop control of the melt pressure may be implemented. In some implementations, a target slew rate (i.e., rate of change) of melt pressure may be specified for at least a portion of the injection molding cycle. The controller may communicate the target slew rate to the Melt Pressure Control Unit, and the control unit may actuate the reciprocating screw to minimize the slew-rate error, i.e. the difference between slew rate computed from, for example, the melt-pressure sensor data and the target slew rate of melt pressure. The control of actuation of the reciprocating screw 36 in view of the measured melt pressure is described below in more detail.

The controller is in further signal communication with Gas Assist Control Unit (GACU) 24. The GACU 24 is configured to inject a gas into the mold cavity 44 through a Gas Assist Pin 50, which may, for example, be provided in a pneumatic channel 52 bored into a mold core 54 of the injection molding system 10. The injected gas, which may comprise nitrogen, carbon dioxide, a mixture such as air, or another suitable gas, but is preferably an inert gas, may be supplied to the Gas Assist Pin 50 from a gas reservoir, a gas generator, or a compressor (not shown). The GACU 24 may control a valve that regulates the flow of the gas from the Gas Assist Pin 50 and into the mold cavity 44. The degree of opening of the valve may increase the flow of gas into the mold cavity and lead to the build-up of Gas Assist pressure. The GACU 24 can comprise a gas-assist pressure sensor 49 that senses the pressure of the gas upstream of the mold cavity or within the mold cavity itself. The GACU 24 may use the signal of the gas-assist pressure sensor to compute a control signal for the valve, thereby allowing closed-loop control of the gas-assist pressure. The GACU 24 may use a closed-loop control algorithm to minimize errors between gas-assist pressure set points and measured and computed gas-assist pressures. Set points of gas assist pressure may be communicated to the GACU 24 by the controller 32. The controller 32 may follow a predetermined time sequence of gas-assist set points stored in its memory or may adjust the set points based on the measured process conditions. The measured process conditions may include progress of filling the mold cavity, melt-flow-front position, determined viscosity of the melt, environmental temperature and humidity, and/or other factors. The changes in set points of the gas-assist cycle based on a variety of measurements are discussed below.

The controller also can be in a communicative connection with a Gas Counter-Pressure Control Unit (GCPCU) 26. The GCPCU 26 is configured to inject a gas into the mold cavity through a Gas Counter Pressure (GCP) supply port 56. The GCP gas can also be vented out of the mold cavity through a GCP vent port 58, which, like the gas assist supply line, may be bored into the mold core 54. The GCP gas, which may comprise nitrogen, carbon dioxide, a mixture such as air, or another suitable gas, but preferably an inert gas, may be supplied to the GCP supply port 56 from a gas reservoir, a gas generator, or a compressor (not shown). The GCPCU 26 may control a valve that regulates the flow of the counter-pressure gas from the GCP Supply port 56 into the mold cavity. The degree of opening of the valve may increase the flow of gas into the mold cavity and lead to the build-up of gas counter pressure. The GCPCU 26 can include a GCP sensor 59 that senses the pressure of the gas downstream of the flow front within mold cavity. The GCPCU 26 may use the signal of the GCP sensor 59 to compute a control signal for the valve, thereby allowing closed-loop control of the GCP process. GCPCU may use closed-loop control algorithm to minimize errors between GCP pressure set points and measured and computed GCP pressures. Set points of GCP may be communicated to the GCPCU by the controller. The controller may follow a predetermined time sequence of GCP set points stored in its memory or may adjust the set points based on the measured process conditions. The measured process conditions may include progress of filling the mold cavity, melt flow-front position, determined viscosity of the melt, environmental temperature and humidity, and/or other factors. The changes in set points of the GCP cycle based on a variety of measurements are discussed below.

Additionally or alternatively, either the GACU 24 or the GPCU 26 (or both) may control a volume flow rate or a mass flow rate of the corresponding gas. In the corresponding implementations, the GACU 24 and/or the GCPCU 26 may include a fluid flow sensor or sensors. Thus, the closed-loop control of the gas-assist process and/or gas counter-pressure may include controlling gas flow rates as an alternative or in addition to pressure control.

With continued reference to FIG. 1, the controller 32 can be in further communication with the Melt Travel Control Unit (MTCU) 28 that determines a value indicative of the extent to which a mold cavity is filled with the melt, such as, for example, a position of the melt flow-front within the cavity. Furthermore, the MTCU 28 may compute and communicate to the controller adjustments of the set points for melt pressure, gas-assist pressure, and gas counter-pressure, correspondingly, for MPCU, GACU, GCPCU. The MTCU 28 may be in signal communication with one or more melt flow front position sensors configured to measure a value indicative of presence of molten polymer, so as to detect the flow front position within the cavity 44. The flow front position sensors in communication with the MTCU 28 may include temperature, pressure, strain, ultrasonic, optical, or other types of sensors. The flow front position sensors sensor or sensors may be disposed at some locations in, at, or near the mold and may or may not come into direct contact with the molten thermoplastic material. The flow front position sensor could be a screw position sensor, as screw position can be indicative of flow front position. The MTCU 28 may use signals from the one or more flow front position sensors in conjunction with calibration routines, pre-programmed computations, or machine learning algorithms to determine, or at least estimate, a flow front position of the injected molten thermoplastic material. In some implementations, the determined flow front position can be communicated to the controller 32, while in other applications, the MTCU 28 may compute adjustments to the set points, as discussed above, and communicate these adjustments to the controller 32. In some implementations, the MTCU 28 may compute a velocity of the flow front as the time rate of change of the flow-front position, and communicate the flow front velocity to the controller 32. Based on the input from the MTCU 28, whether the flow front position or velocity or both, the controller 32 may make adjustments to the operations of any one or more of the MPCU 22, GACU 24, GCPCU 26.

The controller 32 also can be in a communicative connection with the Virtual Cavity Sensor (VCS) 30 to determine the pressure of the melt within the cavity 44 of the mold without the direct measurement of the cavity pressure. The VCS 30 may communicate data indicative of the determined cavity pressure directly to the controller 32 or may use the cavity pressure to compute adjustments to the set points for the operations of MPCU 22, GACU 24, and/or the GCPCU 26.

In some implementations, the controller may be in direct signal communication with sensors or sensor systems that provide information about the state and progress of injection of the melt into the mold cavity. The sensors for determining the flow front or melt travel position may include, by way of example, a cavity pressure sensor, a thermocouple, or a strain gauge. The controller 32 may make adjustments to the operations of any or all the MPCU 22, GACU 24, or GCPCU 26 based on the signals from the directly-connected sensors and with or without the use of either or both the MTCU 28 or VCS 30.

In other implementations, a Melt Pressure Control Unit 22 may be integrated into the controller 32. Likewise, the VCS 30 may be integrated into the controller 32.

Figure 2:
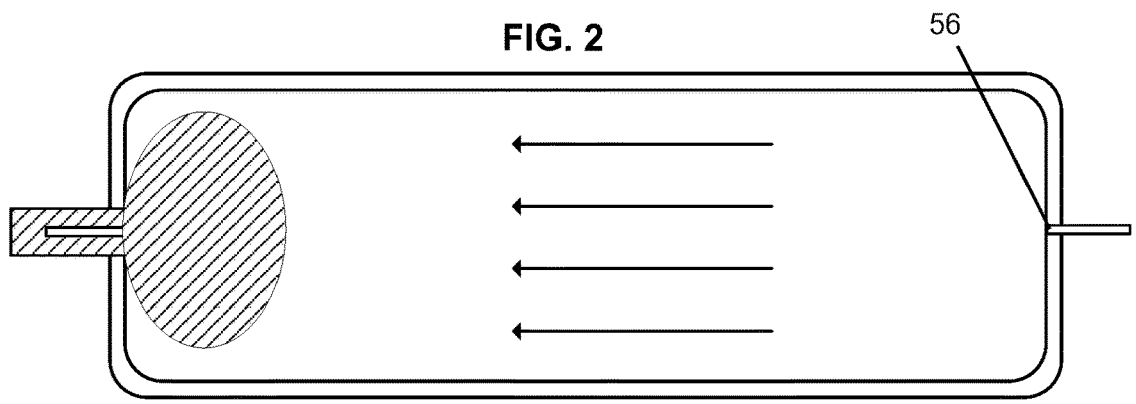
FIG. 2 illustrates, semi-schematically, an interior of a mold cavity subsequent to initiation of introduction of gas from a Gas Counter Pressure source, just after initiation of molten polymeric material into the cavity, and prior to initiation of introduction of gas from a Gas Assist pressure source.
Figure 3:
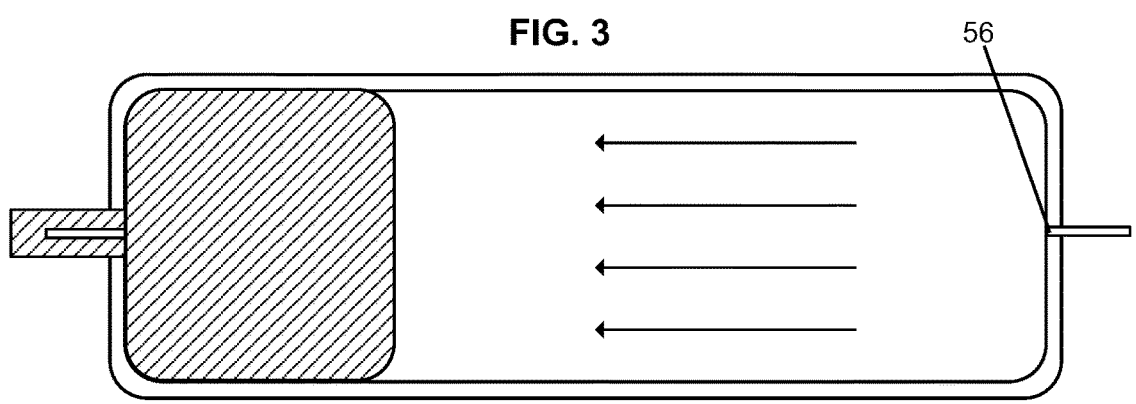
FIG. 3 illustrates, semi-schematically, the interior of the mold cavity illustrated in FIG. 2 immediately prior to introduction of gas from a Gas Assist pressure source.
Figure 4:
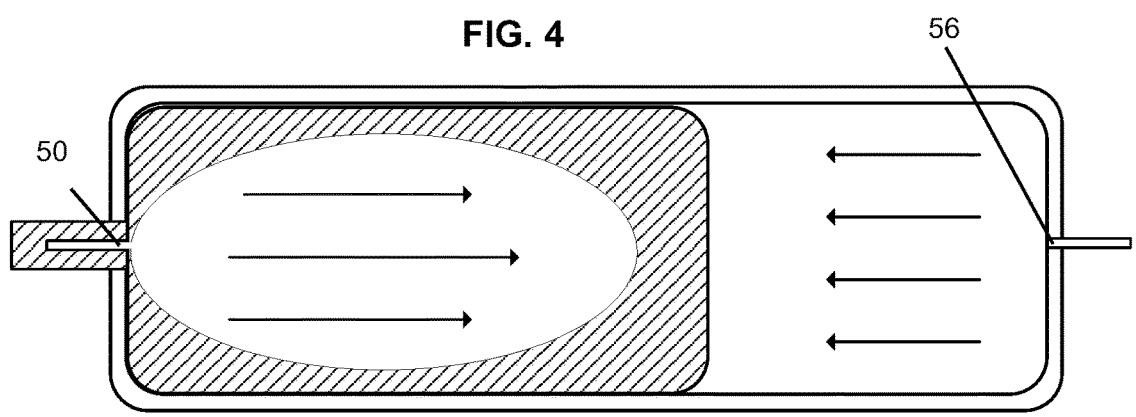
FIG. 4 illustrates, semi-schematically, the interior of the mold cavity illustrated in FIGS. 2 and 3, after introduction of gas from the Gas Assist pressure source.
Figure 5:
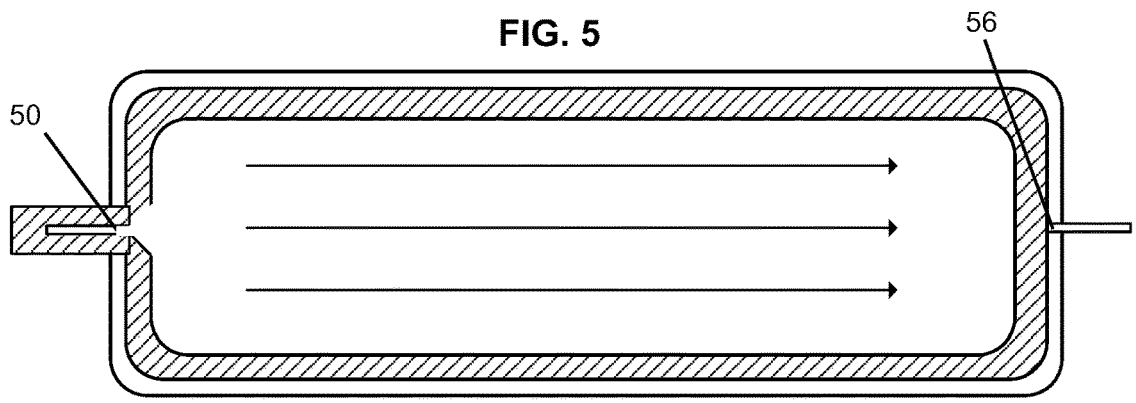
FIG. 5 illustrates, semi-schematically, the interior of the mold cavity illustrated in FIGS. 2-4, at the end of fill.

FIGS. 2-5 illustrate, semi-schematically, the filling of a mold cavity in an injection molding process using Gas-Assist and Gas Counter-Pressure. As illustrated in FIG. 2, as (and even before) the injection of a thermoplastic begins, the cavity may be pressurized with a counter-pressure gas from Gas Counter Pressure supply port 56. As the injection begins, the flow front of the injected thermoplastic experiences the force exerted by the counter-pressure gas on the advancing flow front, as illustrated in FIGS. 2-4. Although the arrows are all pointing to the left, the pressure of the gas acts perpendicularly all surfaces of the expanding shot of thermoplastic, until the melt reaches the walls of the cavity, as illustrated in FIG. 3. Once a required minimum volume of thermoplastic is injected into the mold cavity, a gas-assist process may be initiated, as depicted in FIG. 4. The gas-assist pressure may be introduced via a gas assist port 50 and form a volume of gas inside the injected volume of thermoplastic that may exert pressure normally on all of the surfaces of the expanding bubble of the thermoplastic material, as illustrated in FIG. 4. The gas-assist pressure may be counter-acted, partially by the gas counter-pressure. The process may be controlled to ensure that the gas-assist pressure is higher than the counter-pressure by the amount necessary to allow the flow front to continue advancing at a prescribed rate. As illustrated in FIG. 5, the counter-pressure may be reduced as the flow front approaches end-of-fill, and the gas-assist process may be allowed to work unopposed by the gas counter pressure until the molten material reaches the end of the mold cavity and injection can stop so the molded article may be permitted to cool, and then be ejected from the mold cavity. The gas assist pressure is maintained positive even after the flow front has reached end-of-fill until at least an outer plastic layer of the thermoplastic material has frozen (i.e., solidified).

Figure 6:
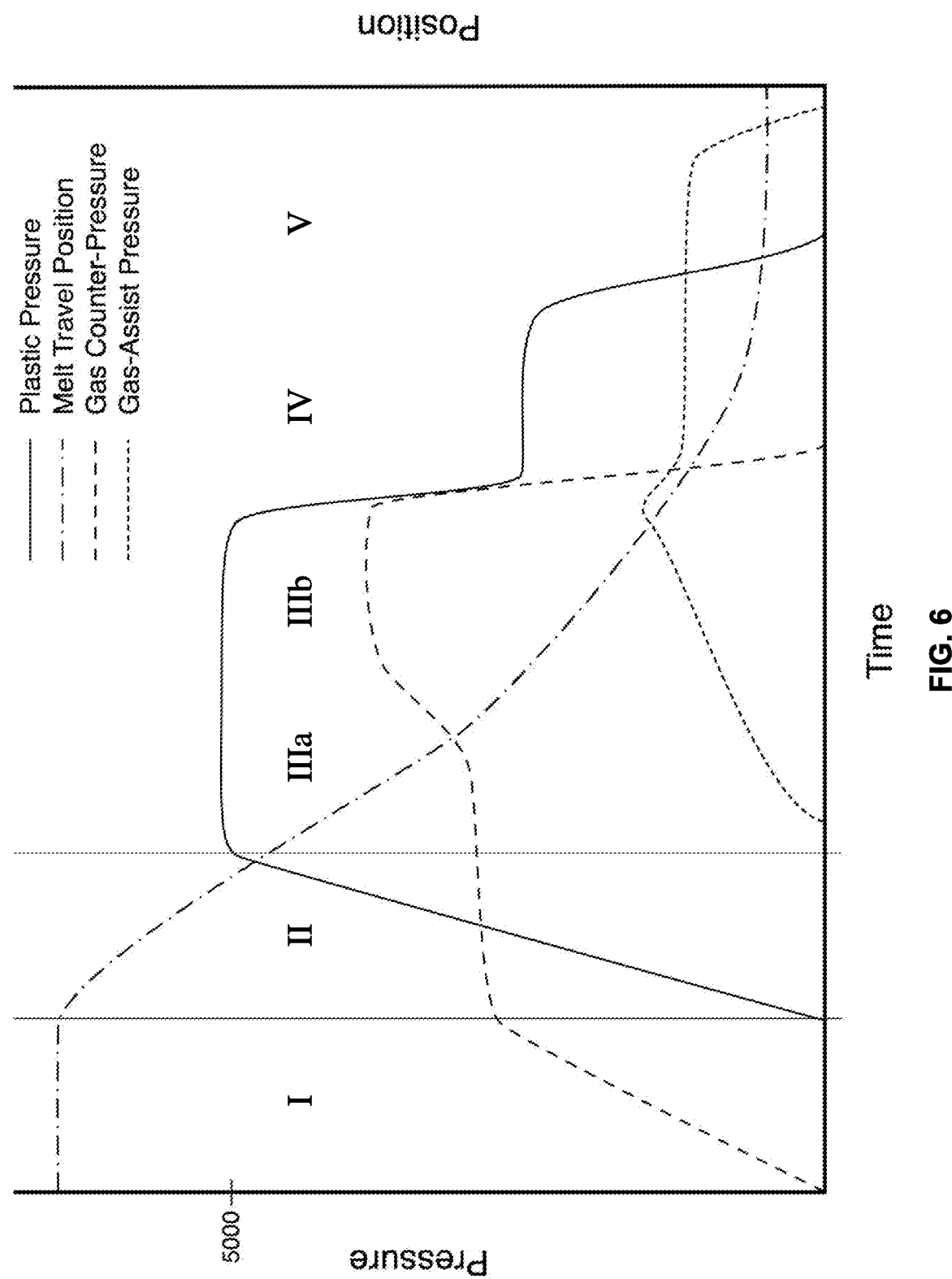
FIG. 6 illustrates an exemplary plot for a molding process incorporating Gas Assist and Gas Counter Pressure closed loop control.

FIG. 6 illustrates an exemplary plot of the injection molding process that combines gas-assist and gas counter-pressure techniques in a single injection molding cycle. The horizontal axis of the illustrated plot represents time, with the left-most point signifying the beginning and the right-most point signifying the end of one fill cycle. There are two vertical axes. The one on the left is a pressure axis, with a single scale for the plastic melt pressure as well as gas assist pressure and gas counter-pressure. The axis on the right represents flow-front position, with the upper-most value indicating a mold cavity prior to injection of molten thermoplastic material, or, alternatively, the location of the nozzle. The bottom of the position axis (at the right side of the plot) indicates a filled mold cavity, or the position of the cavity most distant from the nozzle (i.e., the last portion of the mold cavity to receive thermoplastic material during the cycle). The correspondence between points on the position axis and locations in a mold cavity may depend on mold geometry. Two additional vertical lines in the graph serve to delineate different stages in the injection molding cycle.

The four traces in the graph illustrated in FIG. 6 represent plastic pressure (solid line), melt travel or flow front position (dashed-dotted line), gas counter-pressure (dashed line), gas-assist pressure (dotted line). The plastic pressure trace can represent the melt pressure in the vicinity of the nozzle. The melt travel or flow front position can refer to the farthest distance that the melt has traveled from the nozzle, along the flow direction of the thermoplastic. The gas counter-pressure can refer to the pressure of the counter-pressure gas within the mold cavity or another place in the path of the gas and upstream from the mold. The gas-assist pressure can refer to the pressure of the counter-pressure gas within the mold cavity, downstream of the pin, or another place in the path of the gas and upstream of the pin. In different implementations, the traces may be defined in different ways that are representative of the melt pressure at some point in the path of the melt. The gas counter-pressure and the gas-assist pressure can be defined for or measured at some point in a fluidic (or pneumatic) communication with the corresponding gas in the cavity. The pressure measurements can be absolute or relative to the atmospheric pressure of about 15 psi.

At the beginning of an injection molding cycle, also known as a fill cycle, gas counter-pressure ramps up as the counter-pressure gas fills the mold cavity that may have been fully evacuated (e.g., to atmospheric pressure) at the conclusion of the previous cycle. The time rate of change of the gas counter-pressure, as represented by the slope of the dashed curve in region I of FIG. 6, may depend on the available supply pressure of the counter-pressure gas, the configuration of the pneumatic circuit connecting the counter-pressure supply to the mold cavity, or other process factors. The increase of gas counter-pressure in region I may be increasing in the open-loop manner or controlled by the GCPCU 26 in a closed-loop fashion, as described above. GCPCU 26 may control the increase by setting a target pressure, setting and controlling a target increase rate, or setting multiple points in the gas counter-pressure target profile. One advantage of closed-loop control of the gas counter-pressure in region I may be maintaining consistency in the timing of the fill cycle in the face of variable gas supply pressure or valve performance.

Once the gas counter-pressure achieves or approaches a target value, the controller may signal to the MPCU 22 to commence the injection of the melted thermoplastic or resin into the mold cavity, as illustrated in region II of FIG. 6. The rate at which the melt pressure builds, for example in the vicinity of the nozzle, can depend on the power of the drive of the reciprocating screw, the viscosity of the melt, or other considerations including limiting the wear on the fluidic system delivering the melt. The rate of increase of melt pressure may also depend on the gas counter-pressure level. The increase of melt pressure in region II may be increasing in the open-loop manner or controlled by the MPCU 22 in a closed-loop fashion. The MPCU 22 may control the increase by setting a target pressure, setting and controlling a target increase rate, or setting multiple points in the melt pressure target profile. One advantage of closed-loop control of the melt pressure in region II may be maintaining consistency in the timing of the fill cycle in the face of variable melt properties, variable mechanical resistance in the melt-delivery system, variable counter-pressure settings or other factors.

As the melt pressure near the nozzle begins to increase in region II, the melt may begin to flow into the mold cavity, as is illustrated by the melt travel position curve in the same region. As the melt begins to flow out of the nozzle and the gate into the mold cavity, the melt may encounter little mechanical resistance from sheer forces exerted on the flowing thermoplastic by the cavity walls. On the other hand, the melt encounters some resistance from the gas counter-pressure that may be maintained at a nearly constant level in region II. Once some of the mold cavity begins to fill with the flowing thermoplastic, several effects may lead to increased resistance to the flow and, subsequently, to the requirement for increasing nozzle pressure to maintain the melt travel velocity. One effect may be the increase in sheer forces as the melt comes in contact with the walls of the cavity. Another effect may be due to the cooling of the thermoplastic and a subsequent increase in its viscosity as it enters the cavity. Therefore, as can be seen from the curves in region II of FIG. 6, the velocity of the melt flow front, represented by the slope of the melt travel position curve, may stay relatively constant even as the melt pressure at the nozzle increases. It should be appreciated that the shape of the mold cavity may have a considerable impact on the relationship between nozzle pressure and melt flow front velocity, that the relationship among the traces and their slopes (i.e., time derivatives) may be different for different implementations or mold cavity geometries.

It may be advantageous to control the flow-front velocity of the thermoplastic to produce a part with desired aesthetic as well as mechanical, optical, or other characteristics. In some circumstances, it may be desired, for example, to maintain a nearly constant flow-front velocity, as is illustrated in FIG. 6, particularly regions II, IIIa and IIIb. Methods for maintaining a constant flow front velocity regardless of changes in mold cavity geometry, for example, are described in U.S. patent application Ser. No. 15/198,556, the entirety of which is hereby incorporated by reference.

Toward the right-most edge of region II of FIG. 6, when a sufficient amount of thermoplastic material has been injected into the cavity, the MPCU 22, responding to a signal from the controller 32, may begin maintaining the melt pressure near the nozzle at a predetermined level, signifying a transition to region IIIa. The transition to maintaining constant melt pressure may be based upon time, melt pressure level, and/or flow front position.

In region IIIa, the controller 32 may signal to the GACU 22 to initiate the gas assist process. The precise timing of initiating the injection of the assisting gas may be based on a predetermined schedule or based on, at least in part, the melt pressure level, pressure of the melt in the cavity, flow front position, and may vary based on part geometries. Once the controller determines the time to initiate the gas assist process and signals the GACU 24, the GACU 24, in turn, may open the valve to allow the flow of the assisting gas through the pin into the mold cavity. The assisting gas may form an expanding bubble within the thermoplastic injected into the cavity and contribute to the continued advancement of the flow front. The GACU 24 may adjust the pressure of the assisting gas based on the measurement of the position of the advancing flow front, or the flow-front velocity which can be computed, for example from multiple flow-front positions. In some implementations, other sensor inputs can be detected by the controller 32 and integrated into the decision process for adjusting gas assist, gas counter-pressure and melt injection set points.

Continuing with the region IIIa of FIG. 6, the GACU 24 can increase the pressure of the injected gas assist gas after the start of the gas-assist process. The increase in the gas pressure may maintain the flow rate of the assisting gas after encountering the resistance from the melt. Increasing the gas pressure may also maintain the advancement of the flow front of the melt.

In region IIIb, FIG. 6 illustrates a situation when the controller 32 increases gas counter-pressure. The increase may be, for example, in response to the melt flow front advancing at a greater than optimal or prescribed velocity. To slow the advancement of the flow-front the GCPCU 26 may increase the counter-pressure to a new level, as is illustrated by the increase in the gas counter-pressure trace. The interaction between the gas-assist and the gas counter-pressure keep moving the flow-front. Constraints on the relationship between gas pressure and gas counter-pressure can be imposed by the controller. For example, the controller may ensure a constant ratio between the gas pressure and gas counter-pressure, the ratio being set for a specific part being molded. The pressure ration may be confined to a specific range. An arithmetic difference of the pressures or another mathematical relationship indicative of the quantitative measure of a difference between gas assist pressure and gas counter pressure may be used by the controller 32 to advance the flow front.

Transitioning to the next stage of the filling process, the gas counter-pressure may be reduced, as is illustrated in region IV of FIG. 6. In some implementations, the gas counter-pressure may even be dropped below atmospheric pressure, effectively creating suction on the advancing thermoplastic. Such a negative pressure, or vacuum, is particularly useful when molding, for example, silicone, and aids in advancement of the flow front. The gas-assist pressure continues to advance the thermoplastic to fully fill the mold cavity until the melt flow front reaches the end of the cavity opposite from the nozzle. As the thermoplastic cools, the plastic pressure falls. Finally, after receiving an appropriate control signal, the GCPCU 26 vents the assisting gas before opening the mold cavity. Alternatively, the assisting gas may be allowed to vent as the mold cavity opens to remove the injection molded part.

Once the controller initiates the gas-assist process, three distinct pressure sources are acting on the molten thermoplastic material within in the mold cavity: the injected thermoplastic melt pressure, the gas assist pressure, and the gas counter-pressure. The interaction of the three pressures also can be influenced by the mold cavity geometry, surface chemistry, and thermal properties of the mold. To achieve molded articles that are free of voids, short-shots, blow outs (i.e., the gas assist gas blowing through the flow front or some other wall of the molded article) or other defects, it is desirable to maintain control of each of the gas assist pressure, the gas counterpressure, and the melt pressure. The controller of the present disclosure advantageously communicates with sensors indicative of all three, and has the ability to direct adjustments of any or all three, in real time. This enables the injection molding system, for example, to adjust any or all of the gas assist pressure, the counterpressure, or the melt pressure to accommodate for variations in geometry of a mold cavity during a given shot. In instances where the controller 32 is making adjustments to one or more of these variables based on changes in geometry of the mold cavity, such as changes in thickness, changes in direction, or changes in angles, the controller 32 may be programmed to make adjustments based on detection of the flow front reaching a location that coincides with the location of such a change in geometry within the mold cavity. Alternately, the controller 32 may be programmed to make adjustments based on detection of the flow front reaching a location that is upstream of the location of such a change in geometry within the mold cavity. As a further alternate, or in addition, the controller 32 may be programmed to make adjustments based on detection of the flow front reaching a location that is downstream of the location of such a change in geometry within the mold cavity.

Figure 7:
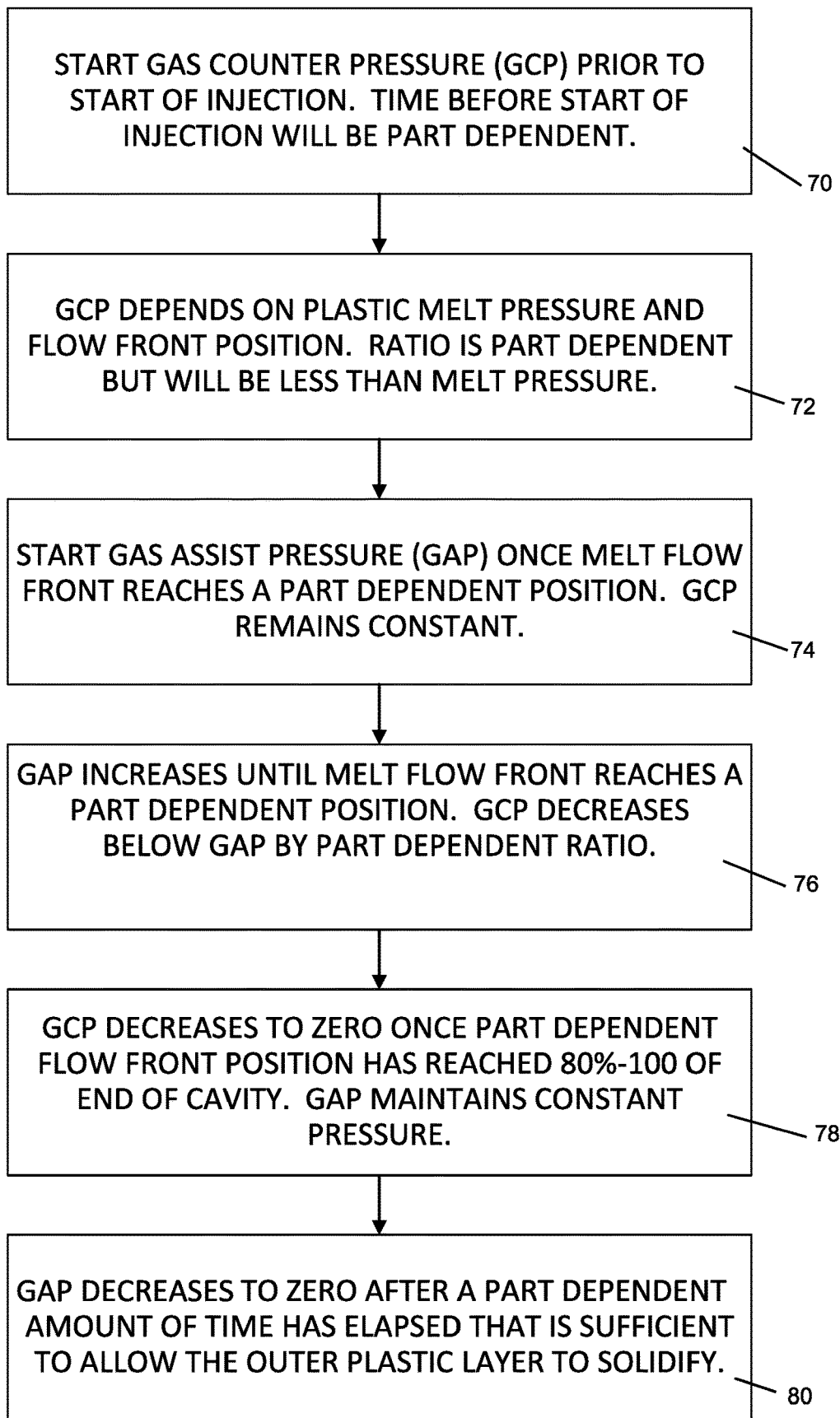
FIG. 7 is a flow chart describing a sequence of steps in the operation of the molding process depicted by the plot of FIG. 5.

FIG. 7 is a block diagram describing the manner in which the controller 32 might operate. In a first block, 70, Gas Counter Pressure (GCP) is initiated prior to initiation of injection of molten polymeric material into the mold cavity. The time elapsing from initiation of gas counter pressure until commencement of injection of the molten material will be part dependent.

As described in a second block, 72, Gas Counter Pressure depends on Plastic Melt Pressure and Flow Front Position. The ratio is part dependent, but the counter pressure will be less than the Melt Pressure.

As described in a third block, 74, once the melt flow front reaches a position, (the optimal location within a given mold cavity to initiate gas assist pressure being part-dependent), the Gas Assist Pressure (GAP) is initiated. Gas Counter Pressure remains constant.

Next, as described in block 76 of FIG. 7, the Gas Assist Pressure increases until the Melt Flow Front reaches a second position (the optimal location within the mold cavity of that second position also being part-dependent). The Gas Counter Pressure decreases below the Gas Assist Pressure according to a part-dependent ratio.

Turning next to block 78, Gas Counter Pressure decreases to zero once the flow front position has reached 80%-100 of end of cavity (the optimal position of reducing the gas counter pressure to zero, for example by venting through the Gas Counter Pressure vent 58 (see FIG. 1) also being part-dependent). Gas Assist Pressure is maintained constant even after venting of the Gas Counter Pressure.

Finally, as described in block 80 of the flow diagraph of FIG. 7, after sufficient time has elapsed for at least an outer plastic layer the article being molded to solidify (a time that, again, is going to be part-dependent), the Gas Assist Pressure is reduced to zero.

The controller 32 may be programmed to not only make adjustments to one or more of the Gas Assist Pressure and Gas Counter Pressure based on detected melt pressure or flow front position, but may also be programmed to effect certain adjustments, such as starting or stopping introduction of Gas Assist Pressure or Gas Counter Pressure, based on other detected conditions, such as stuck valves, completion or commencement of a coining operation (such as described in U.S. patent application Ser. No. 15/198,523, published as US 2017/0001346 A1, the entirety of which is hereby incorporated by reference), movement of collapsible core components, or detection of a pre-ejection sequence. These detected triggers are referred to generically herein as detected mold cavity conditions, and are, generally, factors other than melt pressure or flow front position, and may include commencement or completion of actuation of a collapsible (or otherwise movable) mold wall. Such active control of Gas Assist Pressure and Gas Counter Pressure provides marked advantages over the shortcomings of a purely time-dependent control of Gas Assist Pressure or Gas Counter Pressure.

While various embodiments have been disclosed herein, it will be understood that variations can be made that are still within the scope of the appended claims.

What is claimed is:

1. A method for controlling an injection molding filling cycle, comprising:
   injecting a molten thermoplastic material into a mold cavity;
   injecting a first gas at an initial pressure into a portion of the mold cavity downstream of a flow front of the injected molten thermoplastic material;
   determining a melt pressure of the injected molten thermoplastic material;
   determining a flow front position of the injected molten thermoplastic material;
   injecting, after the flow front has reached a first part specific position in the mold cavity, a second gas at an initial pressure into a portion of the mold cavity upstream of the flow front of the injected molten thermoplastic material;
   increasing the pressure of the second gas until the melt flow reaches a second part specific position of the mold cavity;
   changing, in real-time during a single injection molding filling cycle, the pressure of the first gas at least in part based on at least one of (i) the determined melt pressure of the injected molten thermoplastic material, or (ii) the determined flow front position of the injected molten thermoplastic material; and
   changing, in real-time during the single injection molding filling cycle, in addition to increasing the pressure of the second gas until the melt flow reaches a second part specific position of the mold cavity, the pressure of the second gas at least in part based on at least one of (i) the determined melt pressure of the injected molten thermoplastic material, or (ii) the determined flow front position of the injected molten thermoplastic material.

2. The method of claim 1, wherein in injecting the molten thermoplastic material into the mold cavity, the molten thermoplastic material is injected so as to ensure that a melt pressure variation as a function of time substantially conforms to a melt pressure profile comprising one or more time intervals during which the melt pressure is substantially constant.

3. The method of claim 2, wherein the melt pressure during at least one of the one or more time intervals is at least in part based on the determined flow front position of the injected molten thermoplastic material.

4. The method of claim 1, further comprising calculating a flow front velocity based at least in part on the determined flow front position of the injected molten thermoplastic material.

5. The method of claim 4, wherein changing the pressure of the first gas is at least in part based on the calculated flow front velocity.

6. The method of claim 4, wherein changing the pressure of the second gas is at least in part based on the calculated flow front velocity.

7. The method of claim 1, wherein the determined flow front position coincides with a change in geometry of the mold cavity, the change in geometry including at least one of a change in thickness, a change in direction, or a change in angle.

8. The method of claim 1, wherein the determined flow front position is upstream of a change in geometry of the mold cavity, the change in geometry including at least one of a change in thickness, a change in direction, or a change in angle.

9. The method of claim 1, wherein the determined flow front position is downstream of a change in geometry of the mold cavity, the change in geometry including at least one of a change in thickness, a change in direction, or a change in angle.

10. The method of claim 1, wherein the determined flow front position is upstream of a change in geometry of the mold cavity, the change in geometry including at least one of a change in thickness, a change in direction, or a change in angle, and determining a further flow front position that is downstream of the change in geometry of the mold cavity, and effecting a further change of the pressure of at least one of the first gas or the second gas based on the further flow front position.

* * * * *